UNITED STATES PATENT OFFICE.

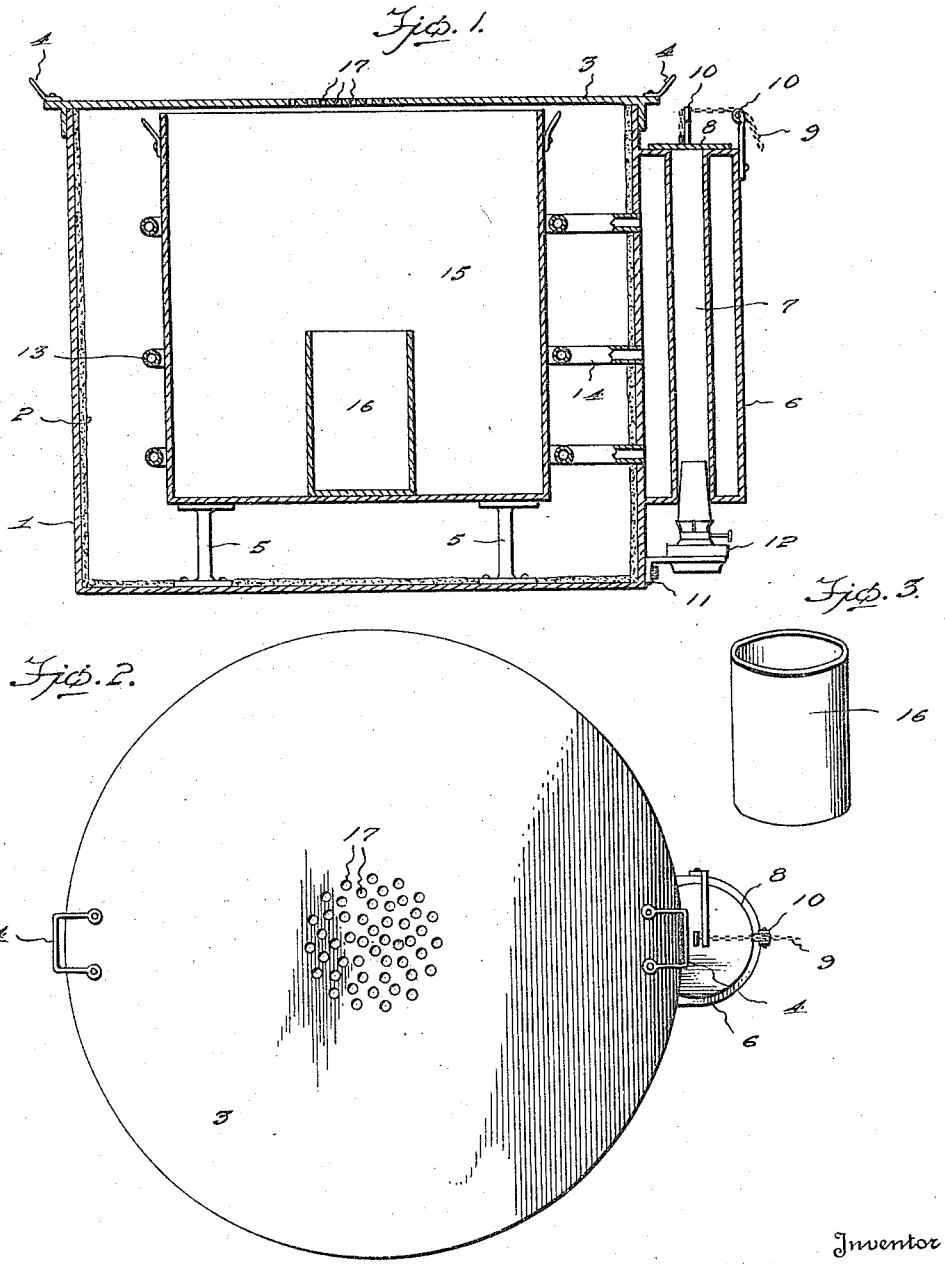

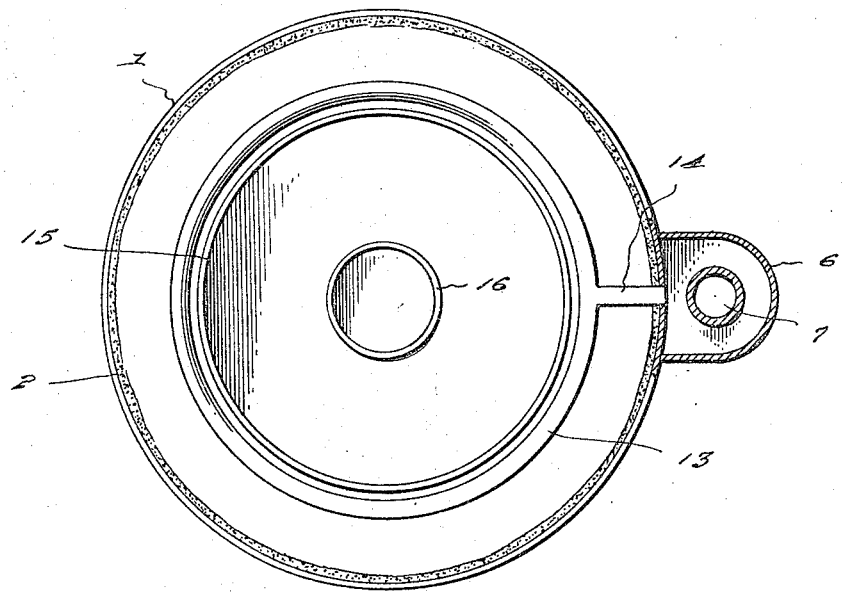
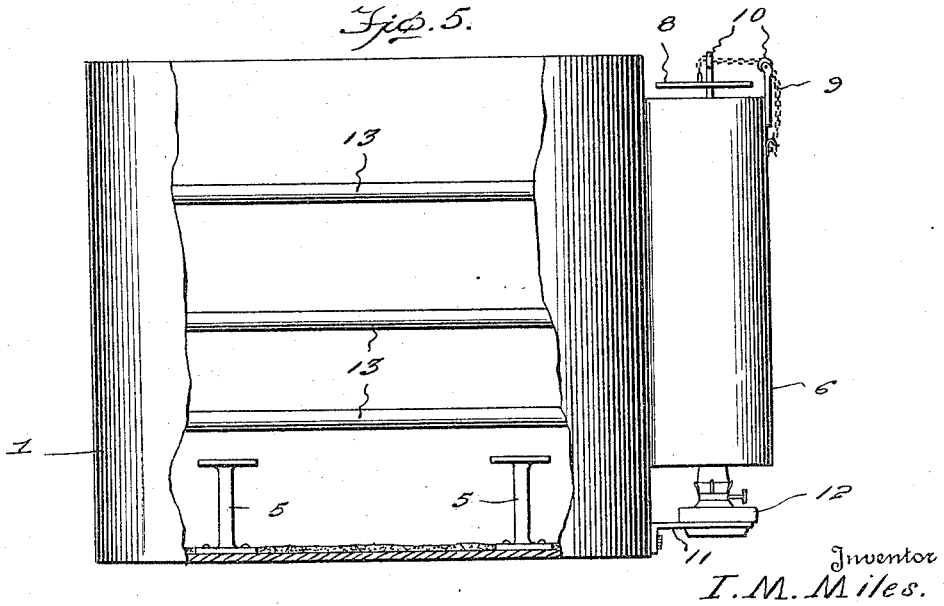

IDA M. MILES, OF WRAY, COLORADO.

DOUGH-RAISER.

1,183,314.	Specification of Letters Patent.	Patented May 16, 1916.

Application filed June 4, 1915. Serial No. 32,127.

*To all whom it may concern:*

Be it known that I, IDA M. MILES, a citizen of the United States, residing at Wray, in the county of Yuma and State of Colorado, have invented certain new and useful Improvements in Dough-Raisers; and I do hereby declare the following to be a full, clear, and exact description of the invention, such as will enable others skilled in the art to which it appertains to make and use the same.

This invention is an improved dough raiser for raising the dough for bread and also for raising the sponge from yeast, the object of the invention being to provide an improved device of this character by means of which dough may be subjected to the proper degree of heat to cause it to raise and thereby greatly facilitate the making of good bread.

The invention consists in the construction, combination and arrangement of devices hereinafter described and claimed.

In the accompanying drawings:—Figure 1 is a vertical central sectional view of a dough raiser constructed in accordance with my invention. Fig. 2 is a plan of the same. Fig. 3 is a detail perspective view of the yeast containing vessel. Fig. 4 is a horizontal sectional view of the dough raiser. Fig. 5 is an elevation of the same partly in section.

In the embodiment of my invention I provide an outer vessel 1 which is here shown as cylindrical in form and which is lined on its inner side with asbestos or other suitable insulating material 2. A suitable removable cover 3 is provided for the outer vessel and is here shown as having handles 4. Supports 5 which are suitably spaced, rise from the bottom of the vessel 1.

On the outer side of the outer vessel is a water tank 6 which is provided with a central vertical flue 7 and with a damper 8 at the upper end of said flue and which may be adjusted by means of a chain 9, said chain passing over suitable direction elements 10. A bracket 11 is secured to the vessel 1 at a point below the tanks 6 and is adapted to hold a lamp 12, the lamp when burning causing the water in the tank to be heated and to maintain the water at a desired heat, as will be understood.

Water circulating pipes 13 which are here shown as circular, and connected to the tank 6 as at 14, are arranged in the tank 1, in spaced relation and concentrically. An inner vessel 15 which is also here shown as circular is placed in the outer vessel in spaced relation thereto, within the circular pipes 13 and caused to bear on the supports 5 so that said inner vessel is spaced from the outer vessel both around its sides and at the bottom, its upper end being closed by the cover 3.

Dough to be raised is placed in the inner vessel 15. If desired, yeast or sponge to be raised may be placed in a container 16 and said container placed in the bottom of the inner vessel 15. The cover is provided with openings 17 for ventilation to the interior of the vessels.

Having thus described my invention, I claim:—

A dough raiser of the class described comprising an outer vessel, having bottom, side, and top walls, an asbestos lining secured to the inner face of the bottom and side walls of said vessel, a pair of supporting brackets secured to the bottom wall of the inner vessel interiorly thereof at relatively spaced distances apart, a hot water tank secured exteriorly to one of the side walls, intermediate the ends thereof, said side walls provided with a plurality of openings communicating with said tank and vessel, a plurality of pipes positioned in said opening, an inner vessel positioned in said outer vessel, and resting upon the brackets for supporting the bottom of the inner vessel at a spaced distance from the bottom of the outer vessel, the inner ends of said pipes circling around the inner vessel, a lamp supporting bracket secured to the side walls of the outer tank below the hot water tank, a lamp in said bracket adapted to heat the water to heat the inner vessel, and a cover for said outer vessel provided with a plurality of perforations centrally thereof to allow for the escapement of heat.

In testimony whereof I affix my signature in presence of two witnesses.

IDA M. MILES.

Witnesses:
 FENTON B. WILLIAMS,
 NELSON J. MILES.

Copies of this patent may be obtained for five cents each, by addressing the "Commissioner of Patents, Washington, D. C."